(12) United States Patent
Long et al.

(10) Patent No.: US 6,886,157 B2
(45) Date of Patent: Apr. 26, 2005

(54) METHOD AND APPARATUS FOR CREATING EFFICIENT NATIVE METHODS THAT EXTEND A BYTECODE INTERPRETER

(75) Inventors: Dean R. E. Long, Boulder Creek, CA (US); Christopher J. Plummer, San Martin, CA (US); Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 707 days.

(21) Appl. No.: 09/865,963

(22) Filed: May 25, 2001

(65) Prior Publication Data

US 2002/0066087 A1 May 30, 2002

Related U.S. Application Data

(60) Provisional application No. 60/207,482, filed on May 25, 2000.

(51) Int. Cl.$^7$ ................................................. G06F 9/45
(52) U.S. Cl. ...................... 717/151; 717/153; 717/165
(58) Field of Search ................................ 717/146, 148, 717/108, 114, 116, 118, 136, 139, 140

(56) References Cited

U.S. PATENT DOCUMENTS

| | | | | |
|---|---|---|---|---|
| 6,205,578 B1 | * | 3/2001 | Grove | 717/118 |
| 6,295,643 B1 | * | 9/2001 | Brown et al. | 717/148 |
| 6,314,563 B1 | * | 11/2001 | Agesen et al. | 717/708 |
| 6,507,946 B2 | * | 1/2003 | Alexander et al. | 717/145 |
| 6,675,371 B1 | * | 1/2004 | York et al. | 717/114 |
| 6,681,381 B1 | * | 1/2004 | Soepenberg et al. | 717/118 |
| 6,704,926 B1 | * | 3/2004 | Blandy et al. | 717/148 |
| 6,735,761 B1 | * | 5/2004 | Ogasawara | 717/140 |

OTHER PUBLICATIONS

Czajkowski et al, "JRes A resources accounting interface for Java", ACM OOPSLA, pp 21–35, 10/98.*
Suezawa, "Persistent execuation state of a Java Virtual Machine", ACM JAVA, pp 160–167, 2000.*
Bouchenak et al, "Efficient Java thread serialization", ACM PPPJ, pp 35–39, Jun. 2003.*
Stichnoth et al, Support for garbage collection at every instruction in a Java compiler, ACM SIGPLAN, pp 118–127, May 1999.*
Chang et al., Interfacing Java to the Virtual Interface Architecture, Jun. 1999, Proceedings of the ACM 1999 Java Grande Conference.

* cited by examiner

Primary Examiner—Anil Khatri
(74) Attorney, Agent, or Firm—Beyer Weaver & Thomas LLP (57) ABSTRACT

Methods, apparatus and computer program products are disclosed for a method of invoking a native method in a Java virtual machine ("JVM"). A special-purpose fast interface, executing in conjunction with an interpreter loop, for native methods reduces C stack recursion in the JVM. The interface performs as an extension to the interpreter loop component in the JVM in that a native method, invoked via the special-purpose interface, is able to modify the interpreter loop state if necessary. This is done without adding new bytecode instructions. A method of executing a native method in a Java virtual machine is described. The JVM first determines whether a native method is to be handled by a special native interface or one of multiple other native interfaces. If it is determined that the method is to be handled by the special native interface, the method is invoked and passed arguments enabling it to access the state of the JVM. The method is then executed. The state of the JVM is adjusted based on the execution of the method such that transition between the interpreter loop and the native method via the special native interface is minimized.

11 Claims, 8 Drawing Sheets

METHOD AND APPARATUS FOR CREATING EFFICIENT NATIVE METHODS THAT EXTEND A BYTECODE INTERPRETER

CROSS-REFERENCE TO RELATED APPLICATIONS

The present application claims priority from provisional patent application filed May 25, 2000, application No. 60/207,482, titled "Method and Apparatus for Writing Time and Space Efficient Native Methods that Extend A Byte-Code Interpreter."

BACKGROUND OF THE INVENTION

1. Field of the Invention

The present invention relates generally to computer software and operating systems. More specifically, it relates to an interface for a Java virtual machine that enables more efficient use of components in the virtual machine and allows for efficient invocation of native methods.

2. Discussion of Related Art

The need to place a Java system or Java virtual machine ("JVM") in consumer and embedded systems is increasing. Devices, appliances, set-top boxes and the like are more likely in the future to contain some kind of implementation of the Java language. As is known in the field, a typical implementation of the Java language is a JVM, containing an interpreter loop (also referred to as a bytecode interpreter) which repeatedly executes bytecodes. The interpreter loop is typically written in a low-level language, such as the C programming language, and executes a stack-based intermediate representation of the Java language called Java bytecodes. A Java system, such as one present in an embedded or consumer device, typically contains a set of libraries written in Java and a set of native methods, written in a language such as C. For Java bytecodes to call native methods, a native method interface is provided by the virtual machine. This native interface is responsible for locating a native method and transferring a set of method arguments from the Java bytecode stack to a native stack (also referred to as a C stack) before execution of the native method. The interface is also responsible for taking a native method's return value and putting it back on the Java stack for subsequent use by Java bytecodes. Essentially, the native method interface takes arguments from the Java stack and places them on the C stack. A common native method interface for Java is the Java Native Interface or JNI.

Other issues arise when using present native method interfaces on systems with limited CPU and memory resources. One issue is that many performance-critical native methods must be run often. However, the native method interface "protocol" takes excessive time for execution. In addition, the native method returns to the interpreter loop, a frame needs to be popped from the Java stack. Another issue is the amount of space utilized by the native stack or C stack. For special method calls, namely, method invocations due to Java reflection (Method.invoke( ) and running constructors for Class.newInstance( )) and running the static initializer <clinit> of a class on the class's first use, there is a native stack usage problem. The C functions that handle the reflection method invocation and <clinit> method invocation recursively call the (Java) interpreter loop to execute the special target method. This means the native stack has a new interpreter frame pushed onto it. This process can go on indefinitely, from interpreter loop to native code to interpreter loop and so on. This recursive call cycle can potentially consume excessive C stack resources and processor clock cycles since the C stack is typically pre-allocated and made sufficiently large to avoid overflow in a worst-case scenario. This overhead for pre-allocating a C stack memory for accommodating a worst-case scenario for stack usage is significant for consumer and embedded devices executing a JVM that have constrained memory and processor resources. Therefore, if recursive C calls contribute to worst-case C stack usage, and those recursive calls can be reduced or eliminated, then worst-case C stack usage can be potentially reduced, thus allowing the size of pre-allocated C stacks to be reduced.

What is needed is a special-purpose native interface that allows a JVM to minimize the amount of memory and processor resources the JVM consumes. In certain cases, the special-purpose native interface used in conjunction with the interpreter loop can potentially eliminate C recursion. In addition, it would be desirable to effectively extend the interpreter loop in a JVM without adding one or more new bytecodes and by allowing certain native methods to directly manipulate or access the JVM state. More specifically, what is needed is a native interface that does not require pushing or popping Java frames, does not require marshaling arguments and method results between the Java and native stacks, and does not require expensive functions callbacks in order to allow the native method to access internal JVM data.

SUMMARY OF THE INVENTION

Methods, systems and computer-readable media are described for executing a native method in a Java virtual machine. In one aspect of the invention, a method of executing a native method in a Java virtual machine is described. The JVM first determines whether a native method is to be handled by a special native interface or one of multiple other native interfaces. If it is determined that the method is to be handled by the special native interface, the method is invoked directly from the interpreter loop according to the protocol required by the special native interface. This enables the method to access the Java virtual machine state such as the Java stack through the arguments passed to it. A special native method is implemented as a native function whose name and signature match those required by the special native interface. During the execution of the function, the state of the Java virtual machine may be adjusted directly, which is more efficient than JNI doing so given that JNI can only modify the JVM state through the use of callback functions. Using the special native interface can be more efficient than JNI in three areas: transition from the interpreter loop to the native method, native method execution, and transition from the native method back to the interpreter loop.

In one embodiment of the present invention, native methods are classified so that they qualify for being handled by a special native interface. In another embodiment, a function pointer is obtained from a method block and used to call the function implementing the special method. The special method function is then passed one or more argument pointers. In yet another embodiment, a pointer to the top of the Java stack and a pointer to a method block pointer is passed to the special native method. In yet another embodiment, the special native method places a transition frame corresponding to a new method on to a stack in the virtual machine. The special native method also pushes arguments associated with the transition frame on to the stack, and a result code is returned. In yet another embodiment the stack is a Java stack and the result code signals that a new transition frame has been pushed onto the stack. In yet another embodiment the state of the Java virtual machine is adjusted by storing a result from the special native method on a Java stack and modifying a Java stack pointer based on the return code. In yet another embodiment stack recursion in the virtual machine is minimized and memory utilized by a stack is reduced while the virtual machine is executing.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method of invoking a native method in a Java virtual machine ("JVM") is described in the various figures. In certain cases, a special-purpose fast interface for native methods used in conjunction with the interpreter loop can potentially eliminate C stack recursion in the JVM. The interface performs as an extension to the interpreter loop component in the JVM in that a native method, invoked via the special-purpose interface, is able to modify the interpreter loop state if necessary. This is done without adding new bytecode instructions to the JVM.

Figure 1:
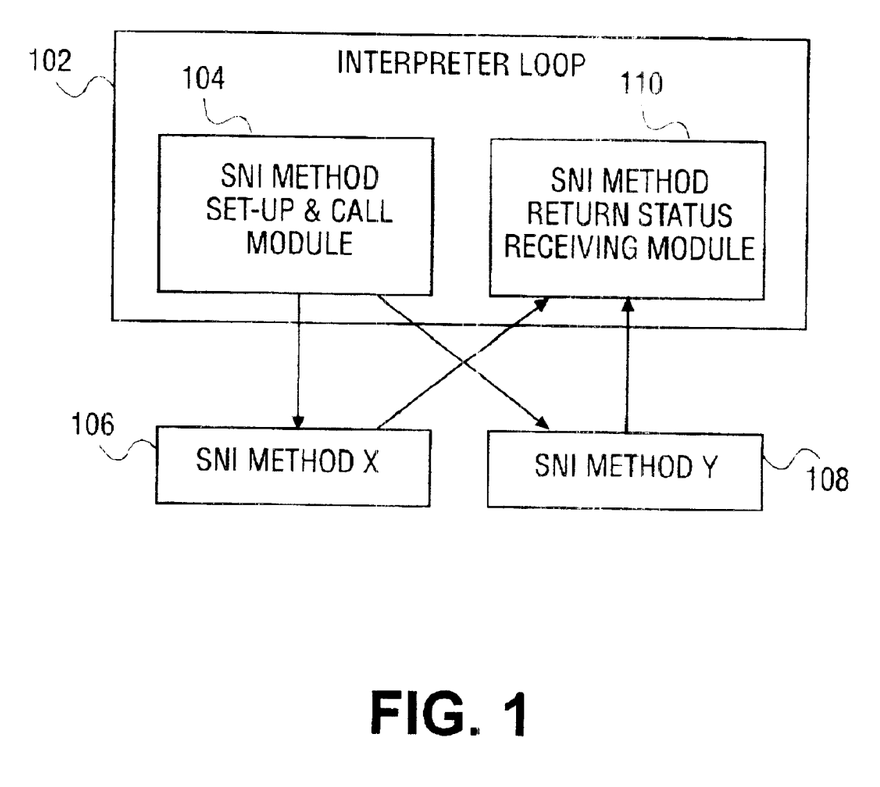
FIG. 1 is a block diagram of an interpreter loop in a Java virtual machine in accordance with one embodiment of the present invention.

In a specific embodiment, the set of native interfaces used by the JVM is extended or modified to include a special native interface referred to as SNI for illustrative purposes. FIG. 1 is a block diagram of an interpreter loop in a Java virtual machine in accordance with one embodiment of the present invention. An interpreter loop 102 is one component in the Java virtual machine described in greater detail in FIG. 6 as component 617 below. A set-up and native method call module 104 is a module responsible for reacting to and communicating with special native methods encountered by the Java virtual machine. Module 104 initiates communication with a native method, such as methods 106 and 108. A special native method 106 or 108 returns certain data to a status return module 110. Module 110 accepts a return value from a special native method and allows interpreter loop 102 to continue execution.

Figure 2:
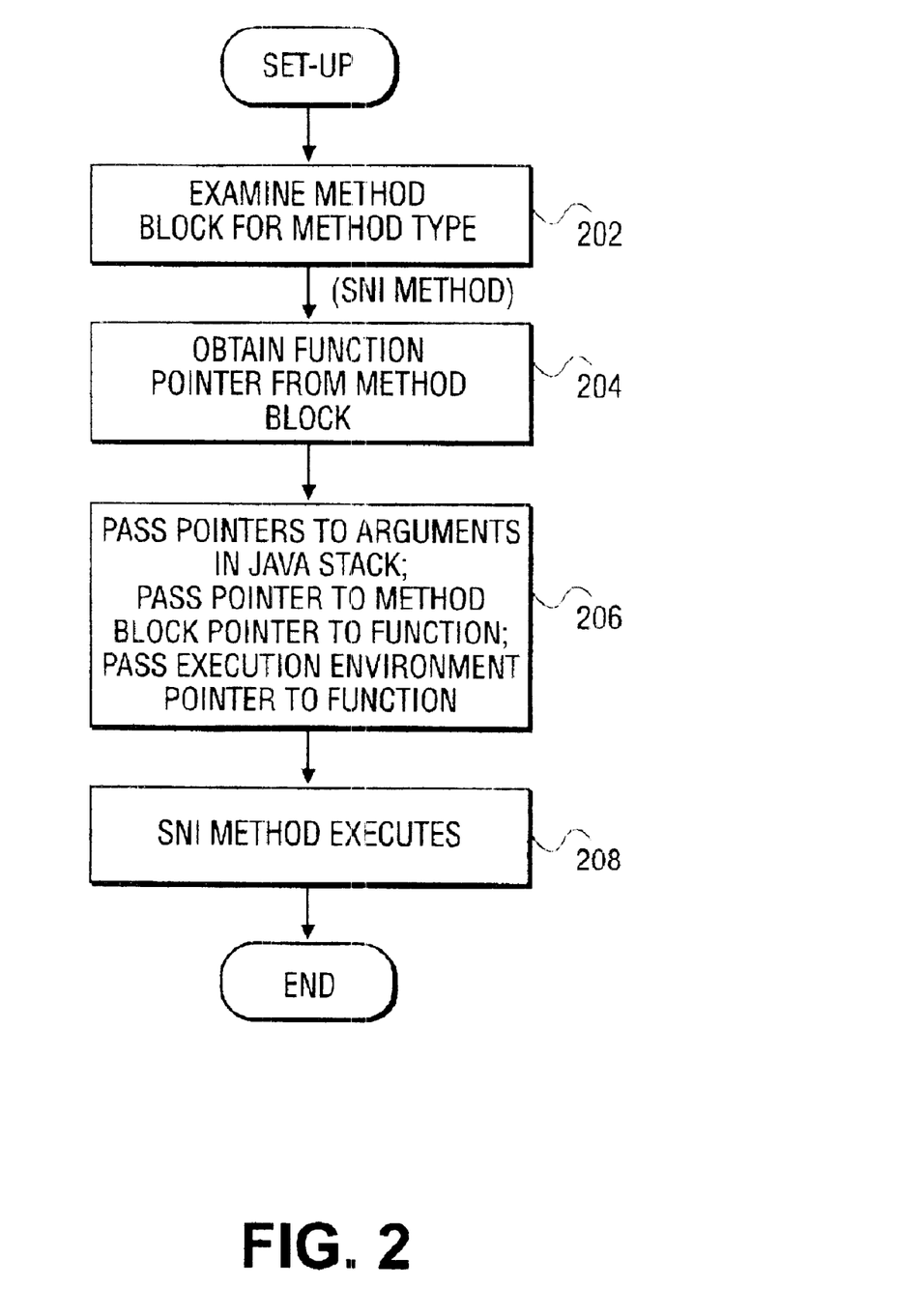
FIG. 2 is a flow diagram of a set-up and call process in the interpreter loop in accordance with one embodiment of the present invention.

FIG. 2 is a flow diagram of a set-up and call process in the interpreter loop in accordance with one embodiment of the present invention. At step 202 the interpreter loop, specifically module 104, examines a method block for the method encountered by the JVM for a method type such as Java, JNI or, in the present invention, SNI. As is known in the field of Java virtual machine programming, a method block is a data structure that represents the method and contains pointers, number of arguments and other data relating to the method. At step 204 the interpreter loop obtains a function pointer from the method block.

At step 206 the interpreter loop calls the method using the function pointer and passes certain data. One type of data passed is a pointer to arguments in a Java stack. Another type of data passed is a pointer to a method block pointer. The use of these pointers is described in greater detail below. Yet another type of data passed is an execution environment pointer as is typically done to access information pertaining to the currently executing thread. At step 208 the SNI method begins execution.

Figure 3:
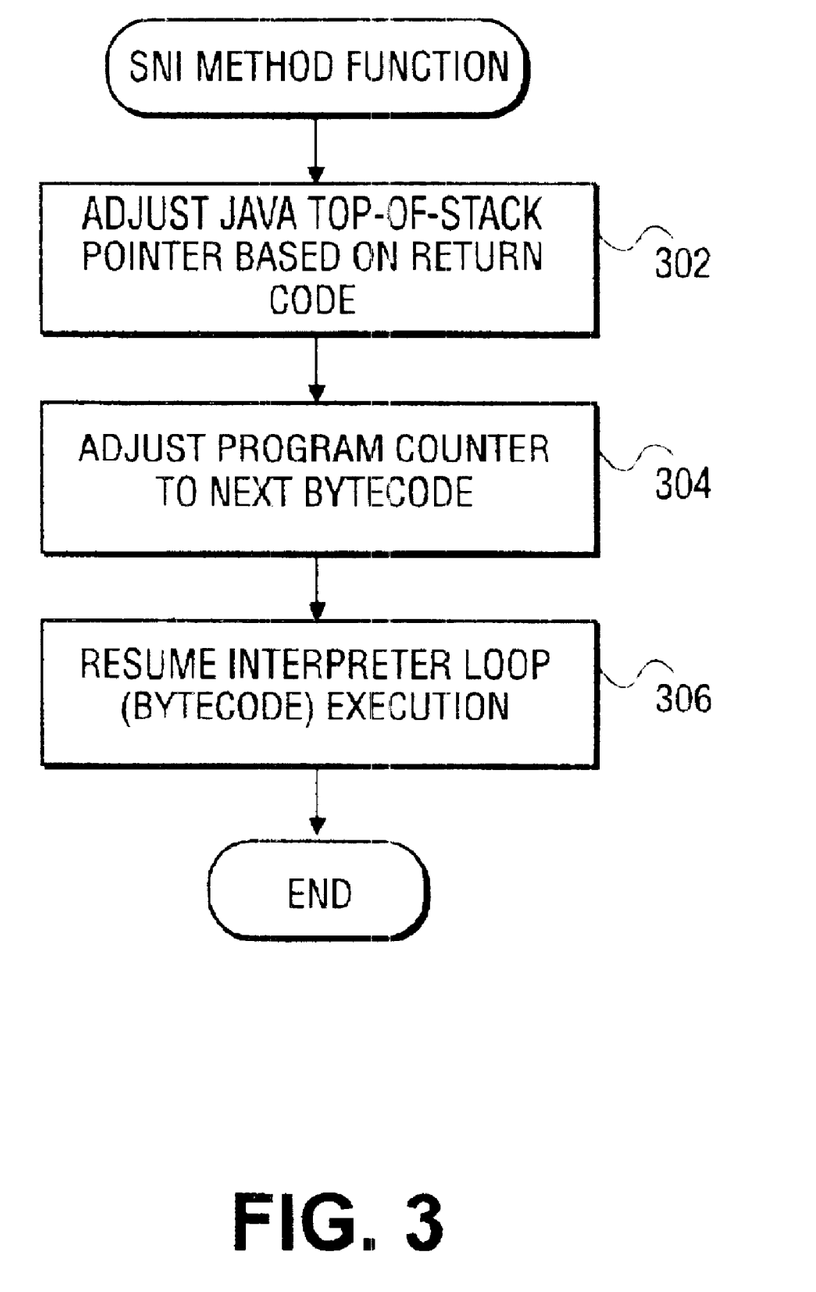
FIG. 3 is a flow diagram describing one scenario of a process for execution of an SNI method in accordance with one embodiment of the present invention.

FIG. 3 is a flow diagram describing one scenario of a process for execution of an SNI method in accordance with one embodiment of the present invention. In the described embodiment, the process shows the instance in which the SNI method returns a result that indicates the size of the method result. The SNI method, executing in conjunction with the interpreter loop, has stored its result in a Java stack in the JVM. It now needs to inform the interpreter loop by how much to adjust the Java top-of-stack pointer based on a return code at step 302. In the described embodiment, the possible return codes are void, single or double. Adjusting the Java top-of-stack pointer is a typical step performed in the JVM when executing methods. At step 304, as is known in the field, a program counter in the interpreter loop is adjusted to the next bytecode to be executed. At step 306 the interpreter loop resumes bytecode execution.

Figure 4:
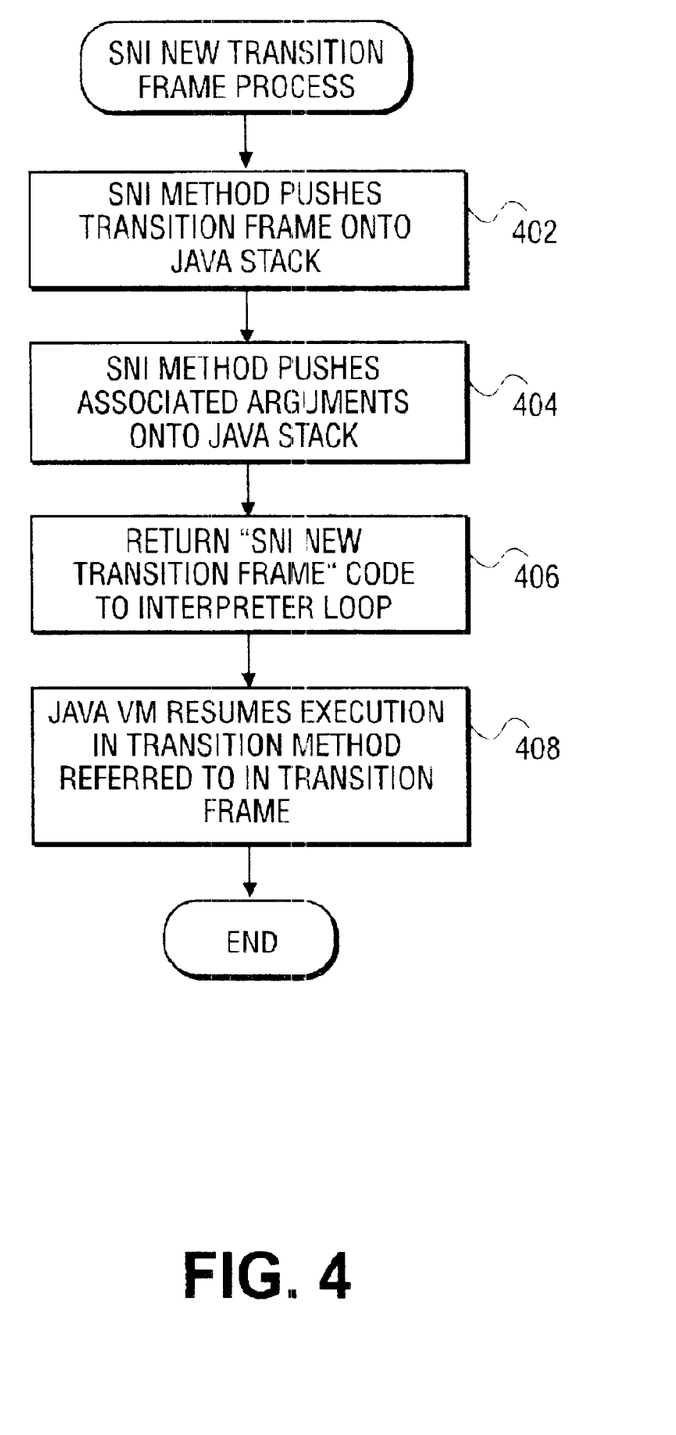
FIG. 4 is a flow diagram of a process for SNI new transition frame in accordance with one embodiment of the present invention.

FIG. 4 is a flow diagram of a process for an SNI new transition frame scenario in accordance with one embodiment of the present invention. In this scenario the SNI method pushes a transition frame onto a Java stack. Transition frames are used to invoke any type of method. At step 404 the SNI method pushes arguments associated with the transition frame onto the Java stack. At step 406 the SNI method returns a result referred to in the described embodiment as a "SNI new transition frame" to the interpreter loop. In the described embodiment, "SNI new transition frame" is the result code returned to the interpreter loop. At step 408 the JVM begins execution of the transition method referred to in the transition frame at which stage the processing of an "SNI new transition frame" return result is complete.

Figure 5A:
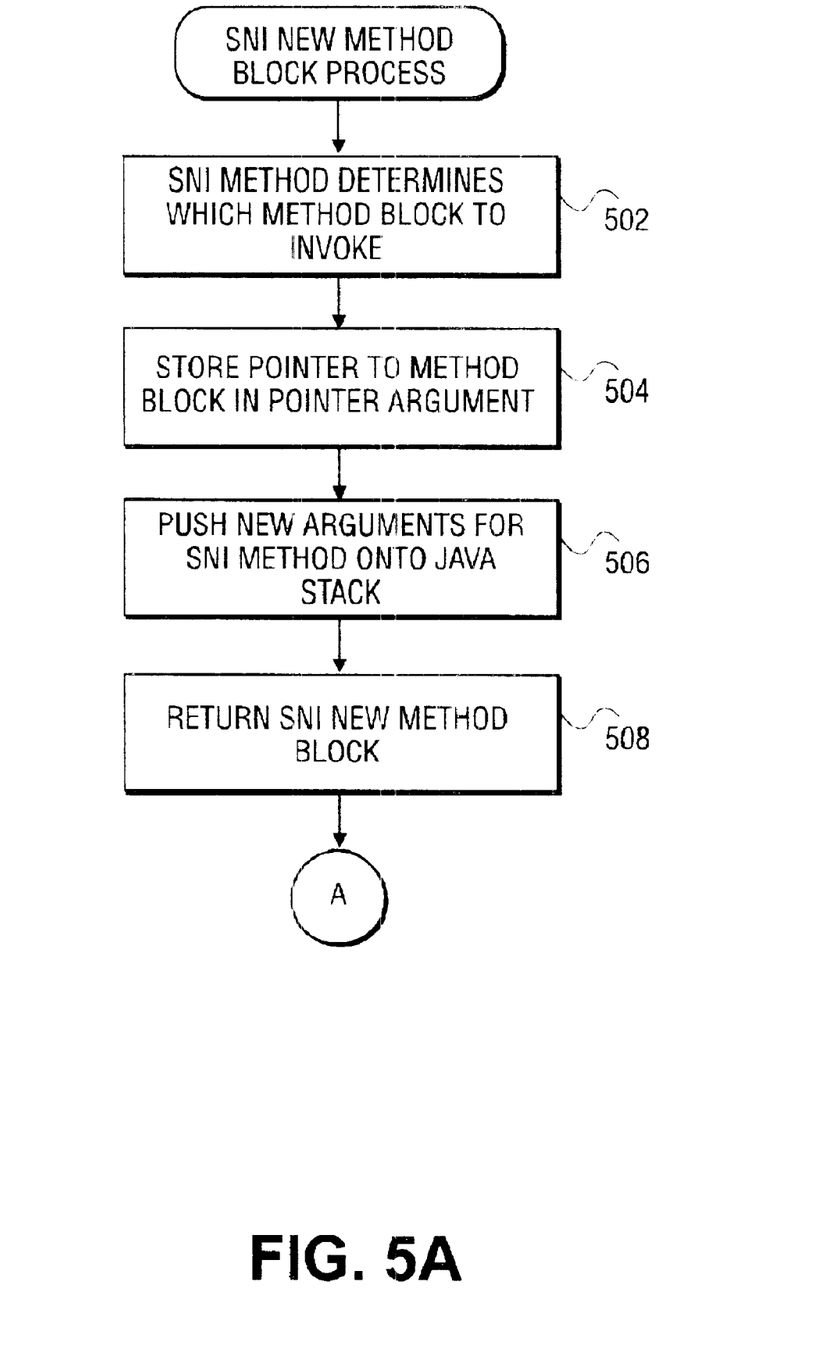
FIGS. 5A and 5B are flow diagrams of a process for an SNI new method block scenario in accordance with one embodiment of the present invention.
Figure 5B:
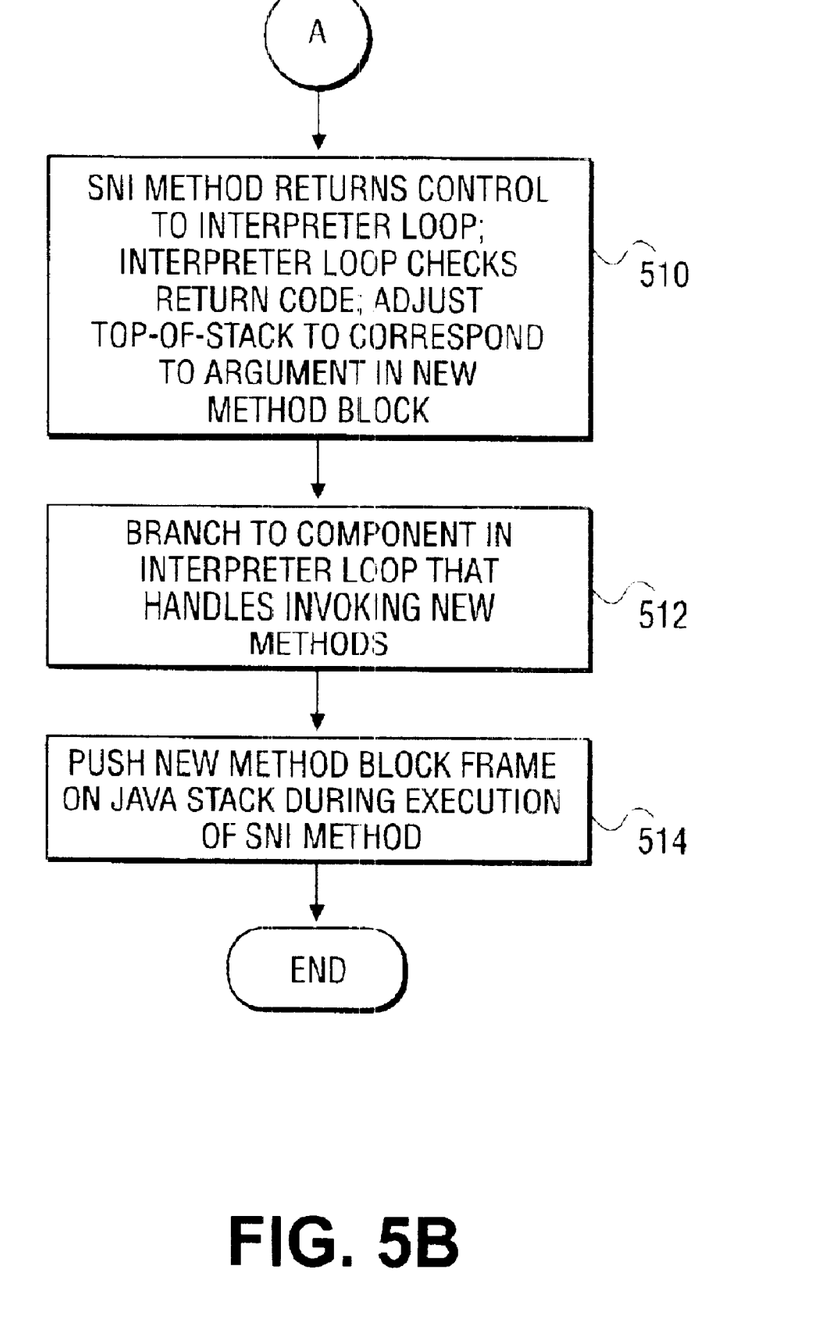

FIGS. 5A and 5B are flow diagrams of a process for an SNI new method block scenario in accordance with one embodiment of the present invention. At step 502 of FIG. 5A an SNI method determines the appropriate method block that it will signal the interpreter loop to invoke. At step 504 the interface stores the pointer to the method block determined in step 502, which can be any type of method block, including an SNI method, in the designated pointer argument described above in step 206. At step 506 SNI native method pushes new arguments for that method onto the Java stack. By doing so, previous arguments in the Java stack for the SNI method may be overwritten. The new method block and control are returned to the interpreter loop at step 508. At step 510 of FIG. 5B the interpreter loop checks the return code from the special native method and adjusts the Java top-of-stack pointer based on the size of the arguments in the new method. At step 512 the interpreter loop branches to the component that handles invoking new methods and does so based on the new method block returned. At this stage the process is complete.

Figure 6:
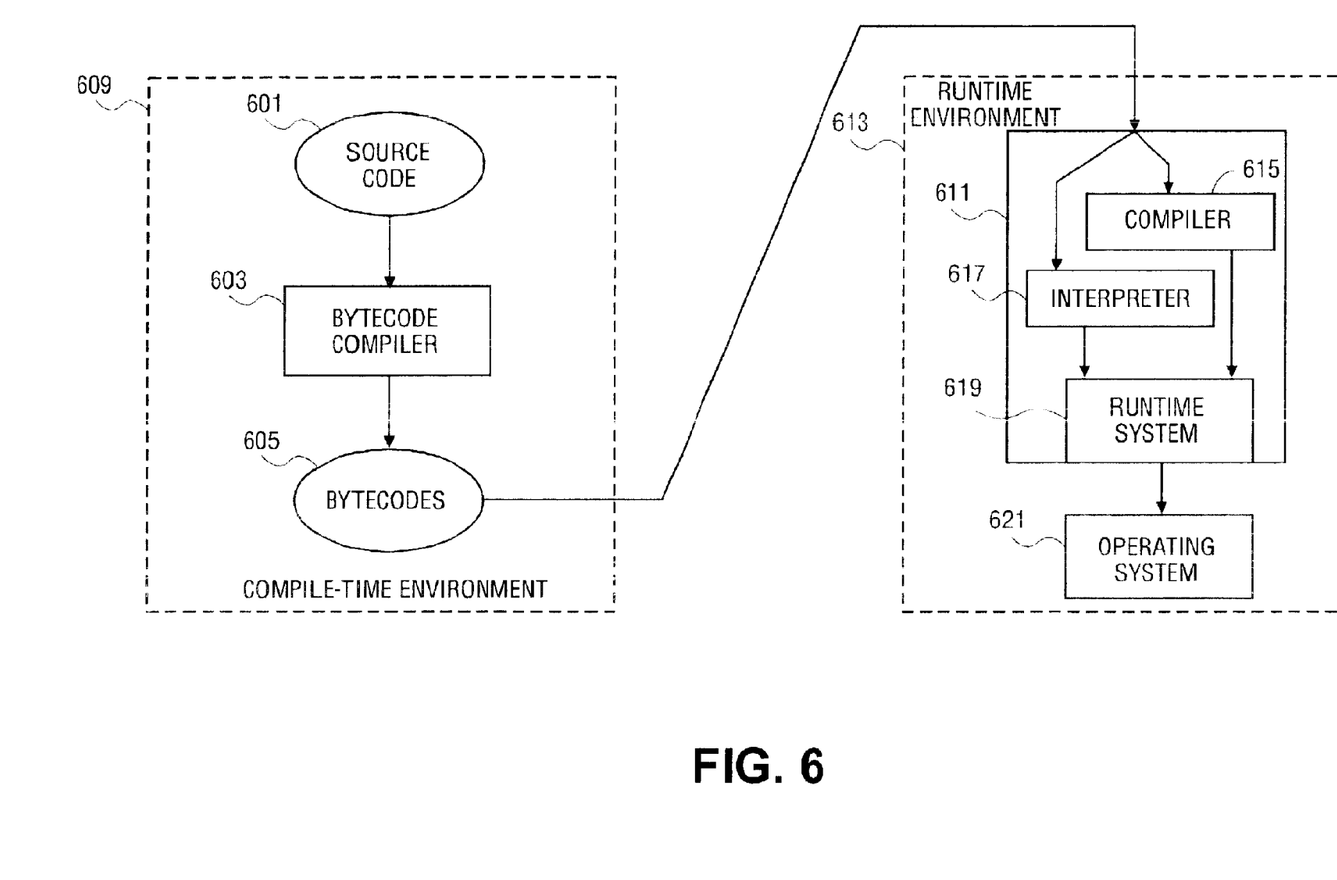
FIG. 6 is a diagrammatic representation of virtual machine in accordance with one embodiment of the present invention.

FIG. 6 is a diagrammatic representation of virtual machine 611 such as JVM 607, that can be supported by computer system 700 of FIG. 7 described below. As mentioned above, when a computer program, e.g., a program written in the Java™ programming language, is translated from source to bytecodes, source code 601 is provided to a bytecode compiler 603 within a compile-time environment 603. Bytecode compiler 609 translates source code 601 into bytecodes 605. In general, source code 601 is translated into bytecodes 605 at the time source code 601 is created by a software developer.

Bytecodes 605 can generally be reproduced, downloaded, or otherwise distributed through a network, e.g., through network interface 1024 of FIG. 10, or stored on a storage device such as primary storage 1004 of FIG. 10. In the described embodiment, bytecodes 603 are platform independent. That is, bytecodes 603 may be executed on substantially any computer system that is running a suitable virtual machine 611. Native instructions formed by compiling bytecodes may be retained for later use by the JVM. In this way the cost of the translation are amortized over multiple executions to provide a speed advantage for native code over interpreted code. By way of example, in a Java™ environment, bytecodes 605 can be executed on a computer system that is running a JVM.

Bytecodes 605 are provided to a runtime environment 613 which includes virtual machine 611. Runtime environment 613 can generally be executed using a processor such as CPU 1002 of FIG. 10. Virtual machine 611 includes a compiler 615, an interpreter 617 implementing interpreter loop 102 described in FIG. 1, and a runtime system 619. Bytecodes 605 can generally be provided either to compiler 615 or interpreter 617.

When bytecodes 605 are provided to compiler 615, methods contained in bytecodes 605 are compiled into native machine instructions (not shown). On the other hand, when bytecodes 605 are provided to interpreter 617, bytecodes 605 are read into interpreter 617 one bytecode at a time. Interpreter 617 then performs the operation defined by each bytecode as each bytecode is read into interpreter 617. In general, interpreter 617 processes bytecodes 605 and performs operations associated with bytecodes 605 substantially continuously.

When a method is called, if it is determined that the method is to be invoked as an interpreted method, runtime system 619 can obtain the method from interpreter 617. If, on the other hand, it is determined that the method is to be invoked as a compiled method, runtime system 619 activates compiler 615. Compiler 615 then generates native machine instructions from bytecodes 605, and executes the machine-language instructions. In general, the machine-language instructions are discarded when virtual machine 611 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 7:
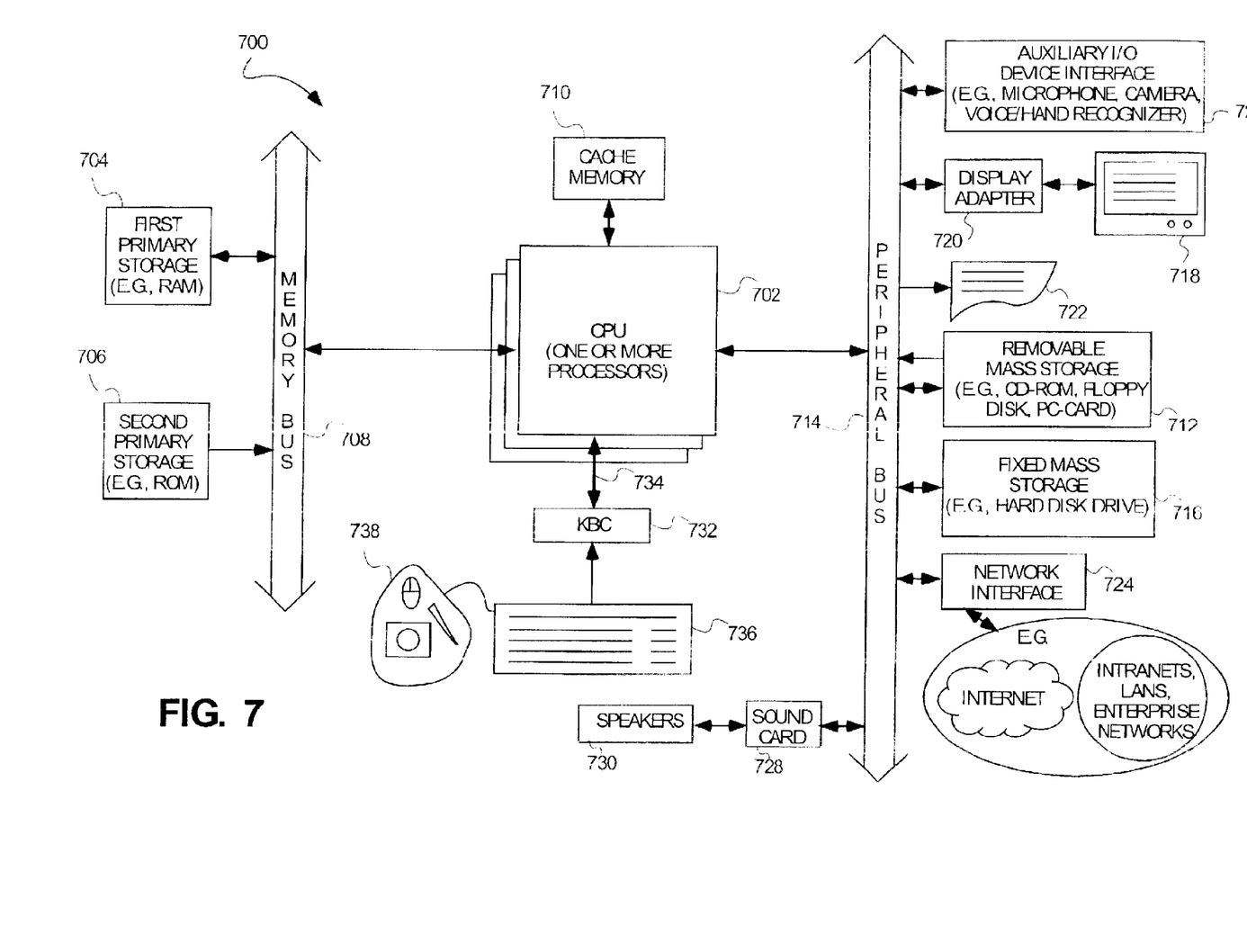
FIG. 7 is a block diagram of a typical computer system suitable for implementing an embodiment of the present invention.

FIG. 7 is a block diagram of a general purpose computer system 700 suitable for carrying out the processing in accordance with one embodiment of the present invention. FIG. 7 illustrates one embodiment of a general purpose computer system. Other computer system architectures and configurations can be used for carrying out the processing of the present invention. Computer system 700, made up of various subsystems described below, includes at least one microprocessor subsystem (also referred to as a central processing unit, or CPU) 702. That is, CPU 702 can be implemented by a single-chip processor or by multiple processors. CPU 702 is a general purpose digital processor which controls the operation of the computer system 700. Using instructions retrieved from memory, the CPU 702 controls the reception and manipulation of input data, and the output and display of data on output devices.

CPU 702 is coupled bi-directionally with a first primary storage 704, typically a random access memory (RAM), and uni-directionally with a second primary storage area 706, typically a read-only memory (ROM), via a memory bus 708. As is well known in the art, primary storage 704 can be used as a general storage area and as scratch-pad memory, and can also be used to store input data and processed data. It can also store programming instructions and data, in the form of a memory stack in addition to other data and instructions for processes operating on CPU 702, and is used typically used for fast transfer of data and instructions in a bi-directional manner over the memory bus 708. Also as well known in the art, primary storage 706 typically includes basic operating instructions, program code, data and objects used by the CPU 702 to perform its functions. Primary storage devices 704 and 706 may include any suitable computer-readable storage media, described below, depending on whether, for example, data access needs to be bi-directional or uni-directional. CPU 702 can also directly and very rapidly retrieve and store frequently needed data in a cache memory 710.

A removable mass storage device 712 provides additional data storage capacity for the computer system 700, and is coupled either bi-directionally or uni-directionally to CPU 702 via a peripheral bus 714. For example, a specific removable mass storage device commonly known as a CD-ROM typically passes data uni-directionally to the CPU 702, whereas a floppy disk can pass data bi-directionally to the CPU 702. Storage 712 may also include computer-readable media such as magnetic tape, flash memory, signals embodied on a carrier wave, PC-CARDS, portable mass storage devices, holographic storage devices, and other storage devices. A fixed mass storage 716 also provides additional data storage capacity and is coupled bi-directionally to CPU 702 via peripheral bus 714. The most common example of mass storage 716 is a hard disk drive. Generally, access to these media is slower than access to primary storages 704 and 706. Mass storage 712 and 716 generally store additional programming instructions, data, and the like that typically are not in active use by the CPU 702. It will be appreciated that the information retained within mass storage 712 and 716 may be incorporated, if needed, in standard fashion as part of primary storage 704 (e.g. RAM) as virtual memory.

In addition to providing CPU 702 access to storage subsystems, the peripheral bus 714 is used to provide access other subsystems and devices as well. In the described embodiment, these include a display monitor 718 and adapter 720, a printer device 722, a network interface 724, an auxiliary input/output device interface 726, a sound card 728 and speakers 730, and other subsystems as needed.

The network interface 724 allows CPU 702 to be coupled to another computer, computer network, or telecommunications network using a network connection as shown. Through the network interface 724, it is contemplated that the CPU 702 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 702 can be used to connect the computer system 700 to an external network and transfer data according to standard protocols. That is, method embodiments of the present invention may execute solely upon CPU 702, or may be performed across a network such as the Internet, intranet networks, or local area networks, in conjunction with a remote CPU that shares a portion of the processing. Additional mass storage devices (not shown) may also be connected to CPU 702 through network interface 724.

Auxiliary I/O device interface 726 represents general and customized interfaces that allow the CPU 702 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 702 is a keyboard controller 732 via a local bus 734 for receiving input from a keyboard 736 or a pointer device 738, and sending decoded symbols from the keyboard 736 or pointer device 738 to the CPU 702. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 708, peripheral bus 714, and local bus 734 are illustrative of any interconnection scheme serving to link the subsystems. For example, a local bus could be used to connect the CPU to fixed mass storage 716 and display adapter 720. The computer system shown in FIG. 7 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of executing a native method in a Java virtual machine comprising:

in the Java virtual machine, determining whether the native method is to be handled by a first native interface or one of a plurality of other native interfaces;

if the native method is to be handled by the first native interface, invoking the method and enabling the native method to access an internal state of the Java virtual machine; and adjusting the state of the Java virtual machine based on execution of the native method.

2. A method as recited in claim 1 further comprising classifying one or more native methods so that the one or more native methods qualify for being handled by the first native interface.

3. A method as in claim 1 further comprising:

eliminating a need to push a Java stack frame onto a Java stack;

eliminating a need to marshal one or more arguments and a method result from the Java stack to a C stack;

eliminating a need to marshal the method result from the C stack to the Java stack; and eliminating a need to pop the Java stack frame from the Java stack.

4. A method as recited in claim 1 wherein determining whether the native method is to be handled by a first native interface or one of a plurality of other native interfaces further comprises examining a method block of the native method to determine a method type.

5. A method as recited in claim 1 further comprising:

obtaining a function pointer from a method block;

invoking the native method function; and passing to the native method function one or more arguments that allow access to a Java virtual machine state to be used by the native method without making callbacks to the Java virtual machine.

6. A method as recited in claim 5 further comprising:

passing to the native method a pointer to arguments on a Java stack; and passing to the native method a pointer to a method block pointer, such that a new method block pointer can be returned to the interpreter loop.

7. A method as recited in claim 1 wherein executing the method in an interpreter loop further comprises:

pushing a transition frame corresponding to a particular method onto a first stack in the Java virtual machine;

the native method pushing a plurality of arguments associated with the transition frame onto the first stack; and returning a result code to the interpreter loop.

8. A method as recited in claim 7 wherein the first stack is a Java stack and the result code indicates that a new transition frame baa been pushed on the Java stack.

9. A method as recited in claim 1 wherein adjusting the state of the JVM further comprises:

storing a result from the native method on a Java stack; and modifying a Java stack pointer based on a return code.

10. A system for executing a native method in a Java virtual machine, comprising:

a processor; and a computer-readable medium storing a program for execution by the processor, the program comprising:

computer code in the Java virtual machine that determines whether the native method is to be handled by a first native interface or one of a plurality of other native interfaces;

computer code that invokes the native method and enables the native method to access a state of the Java virtual machine, if the native method is to be handled by the first native interface; and computer code that adjusts the state of the Java Virtual Machine based on execution of the native method.

11. A computer-readable medium containing programmed instructions of a Java virtual machine arranged to execute a native method in the Java virtual machine, the computer-readable medium including programmed instructions for:

determining whether the native method is to be handled by a first native interface or one of a plurality of other native interfaces;

if the native method is to be handled by the first native interface, invoking the native method and enabling the native method to access a state of the Java virtual machine; and adjusting the state of the Java virtual machine based on execution of the method.

* * * * *

UNITED STATES PATENT AND TRADEMARK OFFICE
CERTIFICATE OF CORRECTION

PATENT NO. : 6,886,157 B2
DATED : April 26, 2005
INVENTOR(S) : Long et al.

It is certified that error appears in the above-identified patent and that said Letters Patent is hereby corrected as shown below:

Column 9,
Line 34, change "baa been" to -- has been --.

Signed and Sealed this

Twelfth Day of July, 2005

JON W. DUDAS
*Director of the United States Patent and Trademark Office*